United States Patent Office 2,794,518
Patented June 4, 1957

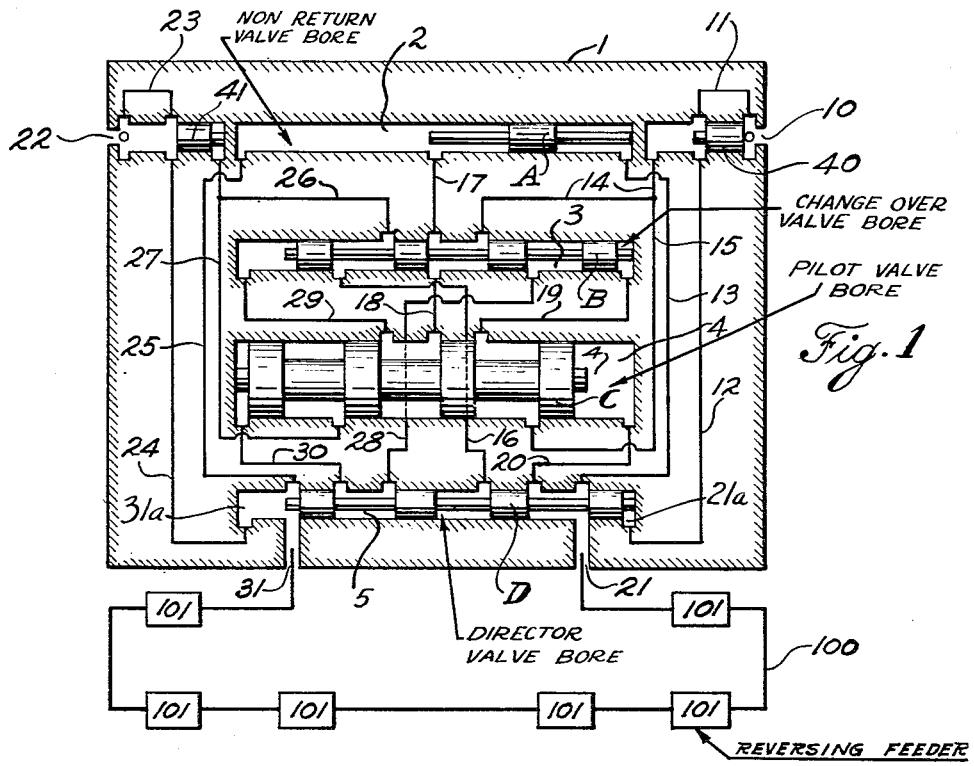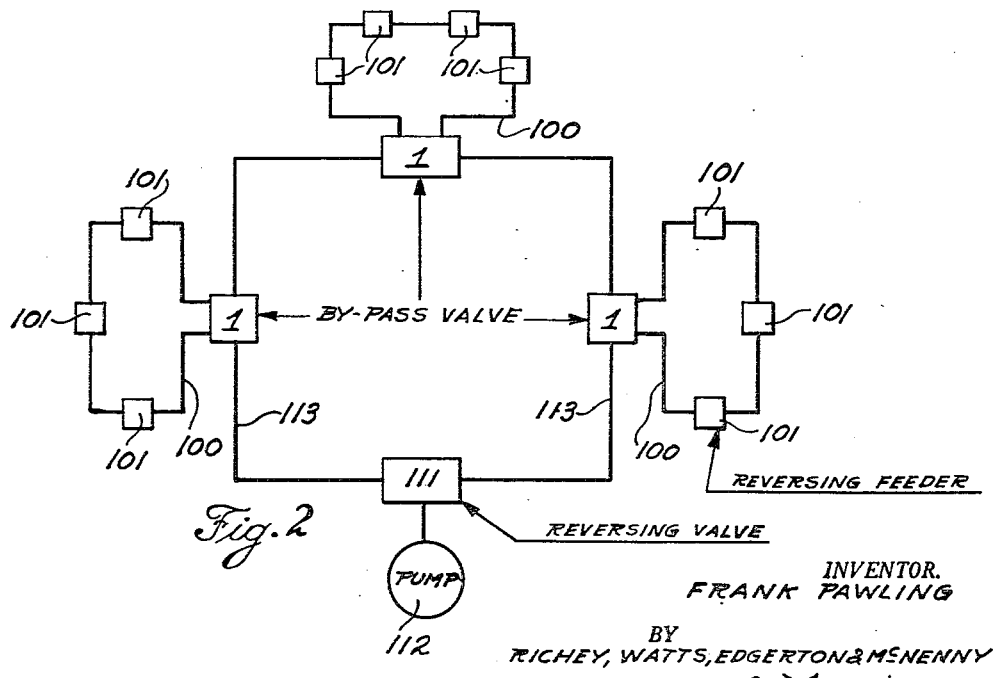

2,794,518

LUBRICATING SYSTEM AND SEQUENCE VALVE THEREFOR

Frank Pawling, Cheltenham, England, assignor to Trabon Engineering Corporation, Cleveland, Ohio Application September 21, 1953, Serial No. 394,136

(Filed under Rule 47(b) and 35 U. S. C. 118)

2 Claims. (Cl. 184—7)

This invention relates to an automatically operable by-pass valve.

Certain fluid flow systems comprise a main conduit having a succession of outlets each for a limited amount of fluid and the arrangement is that fluid flows along the conduit in one direction to each outlet in the succession, the limited amount flows through the outlet and the flow is then continued along the conduit to the next outlet through which the appropriate limited amount flows and so on until the flow reaches the end of the conduit, the flow then being reversed and passing in similar manner, through the same or a different succession of outlets until it reaches the starting position. Usually the main conduit forms a continuous circuit with a source of pressure and flow reversing means at the starting position. Such systems are sometimes employed for supplying lubricant (e. g. oil or grease) from a common source to a number of spaced outlet points.

A difficulty which is sometimes found with systems as described above (especially systems using grease or other highly viscous liquid) is that if the conduit is long and/or if there are a large number of outlets, the resistance to flow of the liquid due to the length of the necessary pipe-line and/or to the obstructions caused by the metering devices employed to control the amount of flow through each outlet becomes excessive and it is an object of the present invention to reduce this difficulty by providing valve means which operate automatically to by-pass through a path of relatively low resistance a section of the main conduit when flow through the outlet or outlets in that section has been completed.

The invention provides a by-pass valve automatically operable to close a by-pass around a section of a main conduit on reversal of the direction of flow of fluid in the main conduit and to open the by-pass on the beginning of flow at the downstream end, for the time being, of the section aforesaid of the main conduit.

It is a feature of the invention that several such by-pass valves may be provided in succession and be arranged to by-pass successive sections of the main conduit at appropriate times.

Preferably the valve, or each valve, is operable as aforesaid for both directions of flow in the main conduit.

More specifically the invention provides a by-pass valve automatically operable as above defined and comprising:

(a) Automatic non-return valve means permitting flow from each end of the by-pass to an intermediate connection but preventing return flow from that connection, (b) Two passageways leading from the aforesaid intermediate connection around the non-return valve means to the two ends of the by-pass respectively and a two-position pressure-operated changeover valve controlling the two passageways and arranged in one position to open one passageway and to close the other and in the other position to close the first-mentioned passageway and to open the second, (c) A pilot valve for admitting fluid pressure from the main conduit to the changeover valve for moving it between its two positions, said pilot valve being arranged and connected for operation by pressure derived from the beginning of flow of fluid at the end which, for the time being, is downstream of the section aforesaid of the main conduit, and (d) A second pressure-operated changeover valve (later referred to as the director valve) operable by reversal of flow in the main conduit between two positions in one of which it directs the main pressure to one end of the section aforesaid of the main conduit and connects the other end of the section to the pilot valve for effecting operation thereof by the fluid flow when the flow reaches that end of the section and in the other of which positions directs the main pressure to the second-mentioned end of the circuit and connects the first-mentioned end to the pilot valve for effecting operations thereof in the reverse direction when the fluid flow reaches that end of the section.

It is preferred that some or all of the valves are of the shuttle type and the non-return valve means (see paragraph (a)) may comprise a shuttle piston movable by the fluid pressure from one side of the intermediate connection to the other.

The by-pass valve preferably includes outlet passageways for relieving to the downstream side, for the time being, of the main conduit, pressure developed by movements of the valves in the operating means for the pilot valve and the first-mentioned changeover valve, and non-return valves in the said passageways. In a preferred arrangement the outlet passages from the pilot valve are controlled by the changeover valve so that the pilot valve is held hydraulically locked unless the changeover valve is in the appropriate position. The non-return valves just mentioned may also serve to prevent return flow through the two passageways described in paragraph (b) above.

As an example of the invention one specific construction of a by-pass valve embodying the above and other features will now be described with reference to the drawings in which:

Fig. 1 is a diagrammatic view showing the by-pass valve associated with a single branch of a main circuit, and Fig. 2 is a diagrammatic view showing a lubricating system including a main circuit and a plurality of branch circuits with a by-pass valve connecting the main circuit with each branch circuit.

As is shown in Fig. 2, a plurality of by-pass valves 1, forming a subject of this application, are incorporated in a lubricating system which comprises a main circuit or conduit 113 which is supplied with lubricant under pressure by pump 112 through a reversing valve 111. Each by-pass valve 1 is connected to both ends of a branch circuit 100 which includes a number of conventional metering devices or feeders 101. This system is applied to the lubrication of a substantial number of points at spaced positions at each of which there is located one of these metering devices or feeders. Each by-pass valve 1 serves to deliver appropriate amounts of lubricant to the several metering devices in its branch circuit and then to by-pass that branch circuit, i. e., to divert the flow of lubricant away from that branch circuit and back to the main circuit. Each by-pass valve 1 operates in this way for both directions of flow of lubricant through the main conduit 113. Fig. 1 shows diagrammatically one by-pass valve 1 and its associated branch circuit 100. In this figure the main conduit 113 is connected to by-pass valve 1 at the passages indicated at 10 and 22. It will be understood that each valve 1 of Fig. 2 is similarly connected in the main conduit 113.

The by-pass valve 1 comprises four valves indicated by letters A, B, C and D and contained in a housing or body constructed of two parts which are connected together. The valve A constitutes the aforesaid non-return valve means, is of the shuttle type and is reciprocably mounted in bore 2. Valve B constitutes the aforesaid changeover valve means, is of the shuttle type, and is reciprocably mounted in cylindrical bore 3. Valve C constitutes the aforesaid pilot valve means, is also of the shuttle type and is reciprocably mounted in the cylindrical bore 4. Valve D constitutes the aforesaid director valve means, is also of the shuttle type and is reciprocably mounted in cylindrical bore 5.

Passage 10 of valve 1 is connected to the main conduit 113 and is connected through passages 11 and 12 with chamber 21a in one end of bore 5 and passage 13 leads from an adjacent portion of bore 5 to the one end of bore 2. Passage 22 is similarly connected to the main conduit 113 and to chamber 31a in the opposite end of bore 5 by passages 23 and 24 and passage 25 leads from the adjacent portion of bore 5 into the other end of bore 2. A passage 17 leads from bore 2 intermediate its ends to the midportion of bore 3. When lubricant under pressure flows through passages 22, 23, 24 and 25 into bore 2, non-return valve A will be moved to the far end of bore 2 as is shown in Fig. 1 and lubricant may then pass through passage 17 in the bore 3 of changeover valve B. Similarly, when the flow of lubricant in the main circuit is reversed and it enters passage 10, the lubricant will flow through passages 11, 12 and 13 and into bore 2 and will move valve A to the opposite end of its bore and the lubricant will then flow through passage 17 into bore 3.

Passages 14 and 26 open out of bore 3 adjacent to the inlet end of passage 17 and are connected, respectively, to passages 11 and 23. When valves A and B are in the positions shown in Fig. 1, lubricant under pressure may flow from bore 2 through passages 17, 14, 11 and 10 and thence into the main conduit 113. Similarly, when valves A and B are at the opposite ends of their bores, lubricant under pressure may flow through passages 17, 26, 23 and thence into the main conduit 113. Thus, it will be understood that passages 14 and 26 are controlled by the changeover valve B since this valve will, at one end of its stroke, connect passages 17 and 14 and at the other end of its stroke will connect passages 17 and 26. It will also be understood that in each of these two positions the flow of lubricant by-passes non-return valve A.

The valve C is a pilot valve for admitting fluid pressure from the main circuit or conduit 113 into the bore for changeover valve B and moving the valve B endwise therein. For this purpose a passage 18 leads from the intermediate part of bore 3 to an intermediate part of bore 4. Adjacent to the outlet end of passage 18 into bore 4, passages 19 and 29 lead to opposite ends of bore 3. It will be understood that when valves A, B and C are in the positions shown in Fig. 1, lubricant under pressure from passage 22 may flow through passages 17, 18 and 29 thereby exerting pressure on the left hand end of changeover valve B, and that when the flow of lubricant through the by-pass valve is in the opposite direction and piston A has been moved to the opposite end of its bore 2, the lubricant under pressure will flow through passages 17, 18 and 19 to the opposite end of bore 3, thereby moving piston B to the left hand end of its bore and connecting passages 17 and 26.

As stated above and as is shown in Fig. 1, passages 12 and 24 open into opposite ends of bore 5 in which is mounted the director valve D. A passage 20 leads from bore 5 adjacent to the inlet end of passage 13 and opens into the adjacent end of bore 4 in which pilot valve C is mounted. Similarly, passage 30 opens out of the opposite end of bore 5 and leads into the adjacent end of bore 4 at the other end of valve C. Thus, when lubricant under pressure enters bore 5 through passage 12, it will move director valve D to the left hand end of its bore as viewed in Fig. 1 and when lubricant under pressure enters bore 5 through passage 24, valve D will be moved in the opposite direction.

Passages 21 and 31 open out of chambers 21a and 31a in bore 5 near the ends of passages 12 and 24, respectively. These passages 21 and 31 constitute the ends of the branch circuit 100 which includes a plurality of metered outlets or feeders 101. It will be understood that when lubricant under pressure enters chamber 31a of bore 5 from passage 24, a portion of that lubricant will flow through passage 25 and into bore 2 as above described. Another portion of such lubricant will flow through passage 31, past the several metered outlets or feeders 101 with delivery of lubricant to each and thence through passage 21 into the bore 5 where it may enter passage 20 and flow into the right hand end, as viewed in Fig. 1, of bore 4 with the result that pilot valve C will be moved toward the left in Fig. 1. Such movement of valve C will effectively connect passages 18 and 29 so that lubricant flowing through passage 25 into bore 2 may flow through passages 17, 18 and 29 and exert pressure on changeover valve B to move it to the right as shown in Fig. 1 whereupon a portion of the lubricant flowing through passage 17 may be diverted through passage 14 and thence through passages 11 and 10 into the main circuit conduit.

Passageways 15 and 27 are provided for relieving to the downstream side for the time being of the main circuit grease from the low pressure end of the valve B and passageways 16 and 28 are provided for relieving grease from the low pressure end of the valve C. These passageways 10 and 22 are provided with shuttle valves 40 and 41 which prevent the application of high pressure from the main circuit to these passageways.

The operation of the by-pass valve will now be described starting from the position shown in the diagram Fig. 1. In this position grease entering at 22 by-passes the branch circuit 100 and passes through the connections 23, 24, 25, 17, 14 and 11 direct through passage 10 to the main circuit. This branch circuit is by-passed because the downstream end dead ends through passage 20 in bore 4 and through passage 13 in bore 2 on the low pressure side of piston A. When the direction of flow of lubricant is reversed and it enters the valve through passage 10, this lubricant moves shuttle valve 40 to the left thereby preventing the flow of high pressure lubricant into passage 15 and opening passage 12 for such lubricant to flow into chamber 21a at the right end of bore 5. This lubricant moves valve D to the left, thereby connecting chamber 21a with passage 21 leading into the right end of branch circuit 100. The high pressure lubricant flows into this branch circuit and through the several reversing feeders 101 in that circuit and finally enters the bore 5 between the two left-hand lands on valve D and thence flows through passage 30 to the left end of bore 4 and moves piston C therein to the right end of its stroke. When the piston C has been so moved, lubricant under pressure may no longer flow through branch circuit 100 but may and then does flow through passage 13 into the right end of non-return valve bore 2 where it will move piston A to the left, thereby opening passage 17 for flow of lubricant from passage 13 through bore 2 into a chamber in the mid-part of change-over valve bore 3 and thence through passage 18 into a chamber in the mid-part of pilot valve bore 4. Since passage 14 which leads from that chamber back to passage 10 is closed by shuttle valve 40 and the lubricant pressure on this valve from passage 14 is less than from passage 10, lubricant will not flow through passage 14. However, lubricant under pressure may flow from bore 4 through passage 19 to the left end of bore 3 since the movement of piston C to the right, as previously described, had connected passages 18 and 19 through bore 3. The lubricant so entering bore 3 will move the piston B to the left, thereby connecting passages 17 and 26 through bore 3. Lubricant flowing under pressure through passage 26 will move shuttle valve 41 to the left to a position similar to that occupied by valve 40 in Fig. 1, thereby opening both ends of passage 23 for the flow of lubricant under pressure about valve 41 and into passage 22.

When the parts have been so shifted the lubricant under pressure will by-pass the branch circuit 100 by flowing through passages 10 and 12, chamber 21a, passage 13, bore 2, passage 17, bore 3 and passages 26, 23 and 22, in that order.

When the reverser valve 111 is actuated to reverse the direction of flow through main circuit 113 and to bring lubricant under pressure into passage 22, the by-pass circuit will be as indicated in Fig. 1; that is, lubricant flowing into passage 22 will flow through passage 24 into chamber 31a, through passage 25, bore 2 and passages 17, 14 and 11 to passage 10.

It is to be understood that the shuttle valves 40 and 41 ensure that, on reversal of flow of grease in the main circuit the grease cannot flow back through the by-pass opened as a result of the last operation of the valve and that the admission of the grease first to the end of valve D ensures that the sequence of operation is correctly initiated.

Referring now to Fig. 2, the lubricating system 110 of the invention includes a reversing valve 111 and a pump 112 for delivering lubricant such as grease under pressure to a main lubricating circuit which includes a main conduit 113. The lubricant is transmitted from the reversing valve 111 through the conduit 113 to a number of branch lubricating circuits 100.

Each of the branch circuits is supplied with lubricant from a by-pass valve 1 which is connected in series with the main conduit 113. Thus, each branch circuit includes a conduit 100 which forms a series connection from the by-pass valve 1 to a plurality of metering devices or feeders 101 and back to the by-pass valve 1.

In operation, lubricant is delivered to the reversing valve 111 and transmitted, e. g. to one end of the conduit 113, whence it is transmitted to the by-pass valve 1, then through the branch circuit 100 to the several metering devices or feeders 101 in succession, and back to the by-pass valve 1. The lubricant then passes on to the next by-pass valve 1 where the same operation takes place, and finally the lubricant from the last valve 1 enters the valve 111. The reversing valve 111 is operated by the returned lubricant so that the direction of feed of lubricant from the pump 112 into the main conduit 113 is reversed.

It is to be understood that the specific nature of the present disclosure is not intended to be restrictive or confining and that various rearrangements of parts and modifications of design may be resorted to without departing from the scope or spirit of the invention as herein claimed.

What is claimed is:

1. A lubricating system comprising a pump for delivering lubricant under pressure, a reversing valve to receive lubricant from said pump, a main circuit to receive lubricant from said reversing valve, a branch circuit to receive lubricant from said main circuit and a by-pass valve for said branch circuit, said by-pass valve having main openings communicating with the main circuit on each side thereof and having branch openings communicating respectively with the ends of the branch circuit, said by-pass valve having means to supply lubricant under pressure to the branch circuit with which it is connected and means to by-pass said lubricant through the valve when the branch circuit has been supplied with lubricant, said means for supplying lubricant to the branch circuit comprising a passage to conduct said lubricant from one of said main openings of the by-pass valve into an end chamber of a director valve bore and to move a valve therein to the other end thereof with resultant opening of a passage connecting said end chamber with one end of said branch circuit, said means to by-pass lubricant under pressure through said by-pass valve including a passage to conduct lubricant from the said end of the director valve bore into an end chamber of a non-return valve bore to move a valve therein to the other end thereof, passages connecting the other end of said branch circuit through an intermediate chamber of said director valve bore with an end chamber of a pilot valve bore to move a pilot valve therein to the other end thereof, passages connecting the said end chamber of said non-return valve bore through an intermediate chamber of a change-over valve bore and an intermediate chamber of said pilot valve bore with an end chamber of said change-over valve bore to move a valve therein to the other end thereof, and a passage connecting an intermediate chamber of the change-over valve bore with the other main opening of the by-pass valve whereby lubricant under pressure may flow from one main opening through the said end chambers of the director valve bore and the non-return valve bore and an intermediate chamber of said change-over valve bore to the other main opening of the by-pass valve.

2. A lubricating system comprising a main circuit, a reversing valve in said circuit to reverse the direction of flow of lubricant through said circuit, a pump connected to the reversing valve to deliver lubricant under pressure thereto, a branch circuit having a reversible feeder therein, and a by-pass valve, said by-pass valve having chambers connected to the main circuit and connectible with the ends of said branch circuit, means in said by-pass valve for directing lubricant under pressure into said branch circuit including a valve to connect one of said chambers with one end of the branch circuit for flow of lubricant thereinto, and means for automatically diverting flow of lubricant under pressure from said chamber to the main circuit beyond the by-pass valve after the branch circuit has been supplied, said means comprising a pilot valve bore, a non-return valve bore, and a change-over valve bore, pistons in said bores, a passage connecting said chamber with one end of the non-return valve bore, a passage connecting the mid-parts of the non-return valve bore, the change-over valve and the pilot valve bore, a passage connecting the mid-part of the change-over valve bore with the main circuit, and means including passages for lubricant for actuating said pistons whereby, after the branch circuit has been supplied with lubricant under pressure through one of said chambers, the lubricant will flow from said chamber through the non-return valve bore and the change-over valve bore and into the main circuit.

References Cited in the file of this patent
UNITED STATES PATENTS

| | | |
|---|---|---|
| 2,240,158 | Hillis | Apr. 29, 1941 |
| 2,266,204 | Hull | Dec. 16, 1941 |
| 2,269,928 | Dirkes | Jan. 13, 1942 |
| 2,369,428 | Berg | Feb. 13, 1945 |
| 2,570,897 | Winchester | Oct. 9, 1951 |
| 2,634,743 | Audemar | Apr. 14, 1953 |